(12) United States Patent
Brooks et al.

(10) Patent No.: US 7,985,707 B2
(45) Date of Patent: Jul. 26, 2011

(54) METHOD OF DEPOSITING ALKALI METALS ON CATALYSTS

(75) Inventors: Christopher J. Brooks, Dublin, OH (US); John M. Pigos, Lewis Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 773 days.

(21) Appl. No.: 11/360,583

(22) Filed: Feb. 24, 2006

(65) Prior Publication Data

US 2007/0203020 A1 Aug. 30, 2007

(51) Int. Cl.
*B01J 21/00* (2006.01)
(52) U.S. Cl. ........................................ 502/240; 502/344
(58) Field of Classification Search .................. 423/656; 502/174, 324, 326, 300, 240, 344
See application file for complete search history.

(56) References Cited

U.S. PATENT DOCUMENTS

| | | | |
|---|---|---|---|
| 2,813,079 A | 11/1957 | Danforth | |
| 3,515,677 A | 6/1970 | Pochowicz | |
| 3,671,597 A | 6/1972 | Kroll | |
| 3,846,282 A | 11/1974 | Hayes | |
| 4,001,196 A | 1/1977 | Witt | |
| 4,188,471 A | 2/1980 | Nasser, Jr. et al. | |
| 4,219,447 A | 8/1980 | Wheelock | |
| 4,244,809 A | 1/1981 | Wheelock | |
| 4,338,292 A * | 7/1982 | Duranleau | 423/656 |
| 4,407,733 A * | 10/1983 | Birkenstock et al. | 502/174 |
| 4,880,763 A * | 11/1989 | Eri et al. | 502/302 |
| 5,231,066 A | 7/1993 | Rekers et al. | |
| 5,235,019 A | 8/1993 | Savariar | |
| 5,235,020 A | 8/1993 | Savariar | |
| 5,239,043 A | 8/1993 | Savariar | |
| 5,321,105 A | 6/1994 | Rekers et al. | |
| 5,641,723 A * | 6/1997 | Bonnemann et al. | 502/326 |
| 5,770,046 A | 6/1998 | Sudhakar | |
| 6,090,741 A | 7/2000 | Wu et al. | |
| 6,093,378 A * | 7/2000 | Deeba et al. | 423/213.5 |
| 6,436,873 B1 * | 8/2002 | Brocker et al. | 502/439 |
| 2002/0076373 A1 * | 6/2002 | Molinier et al. | 423/239.1 |
| 2002/0132727 A1 * | 9/2002 | Labarge et al. | 502/73 |
| 2005/0234137 A1 | 10/2005 | Espinoza et al. | |
| 2006/0030481 A1 * | 2/2006 | LaBarge et al. | 502/324 |

FOREIGN PATENT DOCUMENTS

WO 2004058633 A2 7/2004

* cited by examiner

*Primary Examiner* — Jennifer K. Michener
*Assistant Examiner* — Carlos Barcena
(74) *Attorney, Agent, or Firm* — Capitol City TechLaw, PLLC; Mark E. Duell

(57) ABSTRACT

An alkali metal-containing catalyst is prepared by providing a catalyst-containing component which contains an alkali metal and another catalyst metal, for example, transition and platinum group metals, and contacting the catalyst-containing component with a binder agent in the presence of a non-aqueous, non-polar component to form a mixture. The mixture is then applied to a suitable catalyst substrate and calcined at the appropriate temperature to produce the alkali metal-containing catalyst. One preferred alkali metal is sodium, and oxides of silicon, aluminum and zirconium may be used as binder agents.

20 Claims, No Drawings

METHOD OF DEPOSITING ALKALI METALS ON CATALYSTS

BACKGROUND

1. Field of the Invention

The present teachings relate to methods of depositing or incorporating alkali metals, especially sodium onto the surface of a supported catalyst material while maintaining the physical stability of the catalyst.

2. Discussion of the Related Art

The use of sodium as an activator or modifier of catalyst performance or characteristics is known. A common sodium precursor utilized in catalyst preparation is sodium hydroxide. When dissolved in water, sodium hydroxide dissociates and produces a basic solution, and the hydroxyl ions can attack and destabilize catalyst binding agents, such as, silicate. The exposure to the basic solution can result in a destabilized catalyst structure which can result in the catalyst falling off of the substrate.

Additionally, sodium components on a catalyst can usually be washed off the catalyst when exposed to aqueous impregnation solutions. One typical approach to this problem is to increase the initial sodium loading to compensate for the loss due to exposure to the subsequent aqueous impregnation solutions.

A need exists for a method of depositing or incorporating sodium into a catalyst formulation while maintaining the physical stability of the catalyst and its support or substrate.

SUMMARY

The present teachings provide a method of preparing an alkali metal-containing catalyst by providing a catalyst-containing component containing an alkali metal, then contacting the catalyst-containing component with a binder agent in the presence of a non-aqueous, non-polar component to form a mixture. The mixture is then applied to a catalyst substrate, which is then calcined to produce the final catalyst.

The present disclosure also provides a method of preparing a sodium-containing catalyst by forming a powder composition comprising a sodium-containing component, at least one catalyst-containing component and a catalyst support material. The powder composition is then contacted with a binder agent in the presence of a non-aqueous, non-polar component to form a mixture. The mixture is then applied to a catalyst substrate, which is then calcined to produce the final catalyst.

DETAILED DESCRIPTION

The present teachings provide a method of preparing an alkali metal-containing catalyst by providing a catalyst-containing component containing an alkali metal and contacting the catalyst-containing component with a binder agent in the presence of a non-aqueous, non-polar component to form a mixture. The mixture is then applied to a catalyst substrate, which is then calcined to form the final catalyst on its substrate.

The method can be used with a variety of chemical elements including alkali metals, such as, lithium, sodium, potassium and rubidium. One preferred alkali metal is sodium, and one preferred form of the sodium is sodium hydroxide. Other possible forms of sodium include sodium formate and sodium acetate.

The catalyst-containing component can be in the form of a catalyst-containing powder. The catalyst-containing powder can include one or more element selected from the group consisting of catalyst, modifier and activator. Possible catalysts include transition group metals and platinum group metals. Some preferred catalysts include catalyst formulations for use in catalyzing the water-gas shift reaction to produce hydrogen, such as, catalyst formulations including nickel, palladium, platinum, cobalt, titanium, zirconium, vanadium, niobium, tantalum, chromium, molybdenum, copper, silver and gold, for example.

In the present method, the binder agent can include silicon oxide, aluminum oxide and zirconium oxide.

The present method can utilize a non-aqueous, non-polar component which can be selected from the group consisting of hexane, petroleum ether, cyclohexane, heptane, isobutylbenzene, n-octane, isooctane and hexadecane. A preferred non-aqueous, non-polar component includes hexane.

According to the present method calcining the catalyst substrate can be accomplished by heating the catalyst substrate to a maximum temperature of about 300° C. Higher temperatures can be utilized depending on the degree of sintering of the catalyst that is acceptable. Additional considerations include the thermal durability of the catalyst formulation and catalyst support.

In the present method the catalyst can be deposited on a substrate or monolith such as a ceramic monolith or a metal monolith.

The present teachings also provide for a method of preparing a sodium-containing catalyst by forming a powder composition comprising a sodium-containing component, at least one catalyst-containing component and a catalyst support material. The powder composition is contacted with a binder agent in the presence of a non-aqueous, non-polar component to form a mixture, and the mixture is applied to a catalyst substrate. The catalyst substrate is then calcined to form the final catalyst.

The sodium-containing component can be any acceptable sodium-containing compound including, for example, sodium hydroxide, sodium acetate and sodium formate. One preferred sodium-containing component is sodium hydroxide.

In the present method, the catalyst-containing component includes one or more element selected from the group consisting of catalyst, modifier and activator. The catalyst can include one or more element selected from the group consisting of transition group metals and platinum group metals. Some preferred catalysts include catalyst formulations for use in catalyzing the water-gas shift reaction to produce hydrogen, such as, catalyst formulations including nickel, palladium, platinum, cobalt, titanium, zirconium, vanadium, niobium, tantalum, chromium, molybdenum, copper, silver and gold, for example.

According to the present teachings, the binder agent can include, for example, one or more element selected from the group consisting of silicon oxide, aluminum oxide and zirconium oxide.

The present method can utilize a non-aqueous, non-polar component which can be selected from the group consisting of hexane, petroleum ether, cyclohexane, heptane, isobutylbenzene, n-octane, isooctane and hexadecane. A preferred non-aqueous, non-polar component includes hexane.

According to the present method calcining the catalyst substrate can be accomplished by heating the catalyst substrate to a maximum temperature of about 300° C. Higher temperatures can be utilized depending on various factors including, for instance, the degree of sintering of the catalyst that is acceptable. Additional considerations include the thermal durability of the catalyst formulation and catalyst support.

In the present method the catalyst can be deposited on a substrate or monolith such as a ceramic monolith or a metal monolith.

In the present method, the mixture obtained upon contacting the powder composition with a binder agent in the presence of a non-aqueous, non-polar component can be in the form of a slurry or suspension, depending on the exact composition of the powder composition and the non-aqueous, non-polar component.

According to present theory and not being limited thereby, the alkali metal-containing component likely does not dissolve or dissociate in the non-aqueous, non-polar component utilized in the present methods, thus the mixture does not become basic and react with the binding agent. By not using an aqueous or polar component, the alkali metal-containing component does not solubilize and react with the binding agent. By eliminating or reducing the deterioration of the binding agent, the occurrence of having the catalyst separating from and falling off the catalyst support is reduced.

In addition to avoiding the reaction of a basic solution with the binding agent, the use of a non-aqueous, non-polar component also decreases or, in some embodiments, eliminates the removal of water soluble components from the catalyst. For example, to prevent catalyst components already deposited on a catalyst, such as, for example, alkali metal-containing components or other water soluble components, from washing off the catalyst, the non-aqueous, non-polar component can be used to deposit additional catalyst components. The non-aqueous, non-polar component will not dissolve the deposited water soluble alkali metal-containing component, particularly sodium-containing components, off the catalyst.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Synthesis of Catalyst Powder Compositions

Example 1

A platinum (6% wt), cobalt (2% wt), and sodium metal (2.5% wt) catalyst powder composition was prepared by sequential addition of metal precursor solutions onto a zirconium oxide support. A 1 M solution of cobalt was prepared from cobalt (II) nitrate hexahydrate, 99.999% (Aldrich), and then added to a zirconium oxide support coarse powder (FZO 923 series—MEI Chemicals). The mixture was allowed to sit for approximately 8 hours, and then dried overnight in an oven at 110° C. The dried powder was calcined for 3 hours in a 450° C. furnace. An aliquot of a 9.09% Pt w/w solution of tetraammineplatinum (II) hydroxide solution (Alfa Aesar) was added to the powder, allowed to sit for 8 hours and dried overnight in an oven at 110° C. The dried powder was calcined at 300° C. for 3 hours. Sodium hydroxide solution, 3 M, (Lab Chem Inc.) was added to the powder. Oven drying at 110° C. and calcination at 300° C. for three hours were repeated.

Examples 2-4

Examples 2-4 were prepared as set forth in Example 1 above, but with different sodium precursors utilized. Sodium nitrite, sodium acetate, and sodium formate (all from Alfa Aesar), were used in Examples 2, 3 and 4, respectively. After addition of the sodium precursor solution, the powders were oven-dried at 110° C., and then calcined at 300° C. for 3 hours.

Example 5

A platinum (6% wt), molybdenum (1.62% wt), and sodium (7.5% wt) catalyst was prepared by sequential addition of metal precursor solutions onto a zirconium oxide support. A 1 M solution of molybdenum, prepared from molybdic acid, 85% assay (Alfa Aesar), was added to a zirconium oxide support coarse powder (FZO 923 series—MEI Chemicals). The mixture was allowed to sit for approximately 8 hours, and then dried overnight in an oven at 110° C. The dried powder was calcined for 3 hours in a 450° C. furnace. An aliquot of a 9.09% Pt w/w solution of tetraammineplatinum (II) hydroxide solution (Alfa Aesar) was added to the powder, allowed to sit for 8 hours and dried overnight in an oven at 110° C. The dried powder was calcined at 300° C. for 3 hours. Sodium hydroxide solution, 3 M, (Lab Chem Inc.) was added to the powder. Oven drying at 110° C. and calcination at 300° C. for three hours were repeated.

Examples 6-8

Examples 6-8 were prepared as set forth in Example 5 above, but with different sodium precursors utilized. Sodium nitrite, sodium acetate, and sodium formate (all from Alfa Aesar), were used in Examples 6, 7 and 8, respectively. After addition of the sodium precursor solution, the powders were oven-dried at 110° C., and then calcined at 300° C. for 3 hours.

Honeycomb Pretreatment

A 10 cc (2×3 cm) metal monolith honeycomb was dipped in a 20% nitric acid solution for 1 minute at ambient temperature. The honeycomb was then rinsed in deionized water and the oven-dried at 110° C. After drying, the pre-dipcoat weight of the honeycomb was recorded.

Aqueous Solution 48 g of a catalyst powder (as prepared in Examples 1-8 above), 100 g of de-ionized water and 50 g of aluminum oxide ceramic pellets were added to a wet-ball-mill jar. The mixture was milled for 1 hour. Silicon (IV) oxide, 30% in water, colloidal dispersion solution (Alfa Aesar), 16 g, was added to the mixture to obtain a binder to total catalyst weight ratio of approximately 10%.

Hexane Solution 35 g of a catalyst powder (as prepared in Examples 1-8 above), 1.75 g of aluminum oxide binder (Dispal X-225RL—Salso North American, Inc.), 100 g of aluminum oxide ceramic beads, and 100 ml of hexane were added to a wet-ball-mill jar. The mixture was milled overnight. The ratio of binder to the total catalyst weight is approximately 5%.

Dipcoat Procedure (Aqueous)

The honeycomb was dipped into the aqueous catalyst suspension for several seconds, then removed and lightly blown with air before being placed in an oven for hour at 110° C. The honeycomb was removed from the oven and allowed to cool at ambient temperature for 20 minutes. The weight was then recorded. The sequence of dipping and oven drying was repeated until the desired loading of 2 g was achieved. The fully loaded monolith was dried overnight, and then calcined in a furnace at 300° C. for 3 hours.

Dipcoat Procedure (Hexane)

The honeycomb was dipped in the hexane catalyst suspension for several seconds, then removed and shook lightly to remove excess dipcoat solution. A heat gun was then used to dry the monolith for 10 minutes, rotating the monolith after 5 minutes. The honeycomb was then allowed to cool at ambient temperature before recording its weight. The sequence of dipping and drying was repeated until the desired loading of 2 g was achieved. The fully loaded monolith was then calcined in a furnace at 300° C. for 3 hours.

Evaluation

The catalyst monoliths prepared above were evaluated for adhesion of the catalyst powder to the monolith by weighing the amount of catalyst material lost from the fully loaded monolith. The combinations utilizing both sodium hydroxide as the sodium source and hexane as the non-aqueous, non-polar component suffered less catalyst loss than the other combinations.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

We claim:

1. A method of preparing an alkali metal-containing catalyst, comprising:
    providing a catalyst-containing component containing an alkali metal in a form that does not dissolve appreciably in non-aqueous, non-polar components;
    contacting the catalyst-containing component with a binder agent in the presence of a non-aqueous, non-polar component to form a mixture;
    applying the mixture to a catalyst substrate; and
    calcining the catalyst substrate.

2. The method according to claim 1, wherein the alkali metal comprises one or more element selected from the group consisting of lithium, sodium, potassium and rubidium.

3. The method according to claim 2, wherein the alkali metal comprises sodium hydroxide.

4. The method according to claim 1, wherein the catalyst-containing component comprises a catalyst-containing powder.

5. The method according to claim 3, wherein the catalyst-containing powder comprises one or more element selected from the group consisting of catalyst, modifier and activator.

6. The method according to claim 1, wherein the binder agent comprises one or more element selected from the group consisting of silicon oxide, aluminum oxide and zirconium oxide.

7. The method according to claim 1, wherein the non-aqueous, non-polar component comprises one or more element selected from the group consisting of hexane, petroleum ether, cyclohexane, heptane, isobutylbenzene, n-octane, isooctane and hexadecane.

8. The method according to claim 1, wherein calcining the catalyst substrate comprises heating the catalyst substrate to a maximum temperature of about 300° C.

9. The method according to claim 1, wherein the catalyst substrate comprises a ceramic monolith or a metal monolith.

10. The method according to claim 1, wherein the catalyst comprises one or more element selected from the group consisting of transition group metals and platinum group metals.

11. A method of preparing a sodium-containing catalyst, comprising:
    forming a powder composition comprising a sodium-containing component in a form that does not dissolve appreciably in non-aqueous, non-polar components, at least one catalyst-containing component and a catalyst support material;
    contacting the powder composition with a binder agent in the presence of a non-aqueous, non-polar component to form a mixture;
    applying the mixture to a catalyst substrate;
    calcining the catalyst substrate.

12. The method according to claim 11, wherein the catalyst-containing component comprises one or more element selected from the group consisting of catalyst, modifier and activator.

13. The method according to claim 11, wherein the binder agent comprises one or more element selected from the group consisting of silicon oxide, aluminum oxide and zirconium oxide.

14. The method according to claim 11, wherein the non-aqueous, non-polar component comprises one or more element selected from the group consisting of hexane, petroleum ether, cyclohexane, heptane, isobutylbenzene, n-octane, isooctane and hexadecane.

15. The method according to claim 11, wherein calcining the catalyst substrate comprises heating the catalyst substrate to a maximum temperature of about 300° C.

16. The method according to claim 11, wherein the catalyst substrate comprises a ceramic monolith or a metal monolith.

17. The method according to claim 11, wherein the sodium-containing component comprises sodium hydroxide.

18. The method according to claim 11, wherein the catalyst comprises one or more element selected from the group consisting of transition group metals and platinum group metals.

19. A method of preparing a sodium-containing catalyst, comprising:
    forming a powder composition comprising sodium hydroxide, at least one catalyst-containing component and a catalyst support material;
    contacting the powder composition with an oxide of at least one of silicon, aluminum or zirconium in the presence of hexane to form a mixture;
    applying the mixture to a catalyst substrate; and
    calcining the catalyst substrate.

20. A method according to claim 19, wherein the catalyst-containing component comprises one or more element selected from the group consisting of platinum, cobalt, and molybdenum.

* * * * *